US009762099B2

(12) United States Patent
Jore et al.

(10) Patent No.: US 9,762,099 B2
(45) Date of Patent: Sep. 12, 2017

(54) SEGMENTED STATOR FOR AN AXIAL FIELD DEVICE

(71) Applicant: Boulder Wind Power, Inc., Louiville, CO (US)

(72) Inventors: Matthew B. Jore, Ronan, MT (US); James David Duford, Polson, MT (US); Michael Kvam, Polson, MT (US); Lincoln M. Jore, Ronan, MT (US); David Samsel, Missoula, MT (US); James D. Jore, Polson, MT (US)

(73) Assignee: Boulder Wind Power, Inc., Louisville, CO (US)

( * ) Notice: Subject to any disclaimer, the term of this patent is extended or adjusted under 35 U.S.C. 154(b) by 616 days.

(21) Appl. No.: 14/193,012

(22) Filed: Feb. 28, 2014

(65) Prior Publication Data

US 2014/0175922 A1 Jun. 26, 2014

Related U.S. Application Data

(63) Continuation of application No. 13/144,642, filed as application No. PCT/US2010/000112 on Jan. 15, 2010, now Pat. No. 8,823,241.

(Continued)

(51) Int. Cl.
*H05K 3/26* (2006.01)
*H02K 3/26* (2006.01)
(Continued)

(52) U.S. Cl.
CPC ............ *H02K 3/26* (2013.01); *H02K 1/12* (2013.01); *H02K 3/47* (2013.01); *H02K 21/24* (2013.01);
(Continued)

(58) Field of Classification Search
CPC .. H02K 1/12; H02K 1/24; H02K 3/26; H02K 3/47
See application file for complete search history.

(56) References Cited

U.S. PATENT DOCUMENTS 3,521,091 A 7/1970 Halas
3,641,429 A 2/1972 Cox, Jr. et al.
(Continued)

FOREIGN PATENT DOCUMENTS

CH 665303 4/1988
EP 1732011 12/2006
(Continued)

OTHER PUBLICATIONS

Chinese Office Action dated Dec. 11, 2015 for Chinese Application No. 201410069149.5.
(Continued)

*Primary Examiner* — Dang Le

(57) ABSTRACT

An axial rotary energy device including a segmented stator assembly having a plurality of segments arranged in an annular array. Each stator segment is constructed by stacking a plurality of PCB power conductor layers and a plurality of PCB series layers. Each layer having radial conductors extending from an inner via to an outer via. The vias electrically connect selected radial conductors of the series conductor layer and power conductor layer. Each power conductor layer includes a pair of positive and negative terminal vias for one phase of the electric current connected to selected outer vias. A daughter PCB layer electrically connects two adjacent segments together by having a first portion electrically connected to a negative terminal via located in one segment and a second portion electrically connected to a positive terminal via located in an adjacent (Continued)

segment together with a current conductor electrically connecting the two terminal vias together.

22 Claims, 17 Drawing Sheets

Related U.S. Application Data

(60) Provisional application No. 61/205,435, filed on Jan. 16, 2009.

(51) Int. Cl.
    *H02K 1/12* (2006.01)
    *H02K 3/47* (2006.01)
    *H02K 21/24* (2006.01)

(52) U.S. Cl.
    CPC ...... *H02K 2203/03* (2013.01); *H02K 2211/03* (2013.01)

(56) References Cited

U.S. PATENT DOCUMENTS

| | | |
|---|---|---|
| 3,719,845 A | 3/1973 | Takeda |
| 3,793,530 A | 2/1974 | Carter |
| 3,796,039 A | 3/1974 | Lucien |
| 3,845,339 A | 10/1974 | Merkle et al. |
| 4,035,659 A | 7/1977 | Jeppson |
| 4,096,625 A * | 6/1978 | Morreale ............... H02K 3/522 |
| | | 29/596 |
| 4,168,439 A | 9/1979 | Palma |
| 4,242,628 A | 12/1980 | Mohan et al. |
| 4,261,441 A | 4/1981 | Wood |
| 4,281,965 A | 8/1981 | Stjernholm |
| 4,291,233 A | 9/1981 | Kirschbaum |
| 4,292,532 A | 9/1981 | Leroux |
| 4,318,019 A | 3/1982 | Teasley et al. |
| 4,336,475 A | 6/1982 | Morinaga et al. |
| 4,418,287 A | 11/1983 | Syverson |
| 4,634,912 A | 1/1987 | Heyraud |
| 4,658,162 A | 4/1987 | Koyama et al. |
| 4,677,332 A | 6/1987 | Heyraud |
| 4,720,640 A | 1/1988 | Anderson et al. |
| 4,733,115 A | 3/1988 | Barone et al. |
| 4,763,053 A | 8/1988 | Rabe |
| 4,804,574 A | 2/1989 | Osawa et al. |
| 4,906,060 A | 3/1990 | Claude |
| 4,970,404 A | 11/1990 | Barger |
| 4,992,920 A | 2/1991 | Davis |
| 4,994,684 A | 2/1991 | Lauw et al. |
| 5,028,804 A | 7/1991 | Lauw |
| 5,083,077 A | 1/1992 | Wallace et al. |
| 5,097,167 A | 3/1992 | Kanayama et al. |
| 5,099,162 A | 3/1992 | Sawada |
| 5,237,230 A | 8/1993 | Sugiyama et al. |
| 5,239,251 A | 8/1993 | Lauw |
| 5,260,617 A | 11/1993 | Leibowitz |
| 5,289,042 A | 2/1994 | Lis |
| 5,299,913 A | 4/1994 | Heidelberg |
| 5,315,159 A | 5/1994 | Gribnau |
| 5,370,711 A | 12/1994 | Audit et al. |
| 5,418,446 A | 5/1995 | Hallidy |
| 5,439,488 A | 8/1995 | Audit et al. |
| 5,506,453 A | 4/1996 | McCombs |
| 5,525,894 A | 6/1996 | Heller |
| 5,587,643 A | 12/1996 | Heller |
| 5,589,722 A | 12/1996 | Sakaguchi et al. |
| 5,619,085 A | 4/1997 | Shramo |
| 5,637,945 A | 6/1997 | Yamamuro et al. |
| 5,723,933 A | 3/1998 | Grund et al. |
| 5,783,894 A | 7/1998 | Wither |
| 5,798,631 A | 8/1998 | Spee et al. |
| 5,798,632 A | 8/1998 | Muljadi |
| 5,841,208 A | 11/1998 | Abe |
| 5,842,312 A | 12/1998 | Krumme et al. |
| 5,844,324 A | 12/1998 | Spriggle |
| 5,844,341 A | 12/1998 | Spooner et al. |
| 5,986,438 A | 11/1999 | Wallace et al. |
| 6,016,015 A | 1/2000 | Willard, Jr. |
| 6,040,650 A | 3/2000 | Rao |
| 6,064,123 A | 5/2000 | Gislason |
| 6,066,945 A | 5/2000 | Shimazu et al. |
| 6,072,303 A | 6/2000 | Nickoladze et al. |
| 6,097,104 A | 8/2000 | Russell et al. |
| 6,153,944 A | 11/2000 | Clark |
| 6,157,147 A | 12/2000 | Lin |
| 6,160,336 A | 12/2000 | Baker, Jr. et al. |
| 6,163,097 A | 12/2000 | Smith et al. |
| 6,163,137 A | 12/2000 | Wallace et al. |
| 6,172,429 B1 | 1/2001 | Russell |
| 6,177,735 B1 | 1/2001 | Chapman et al. |
| 6,215,199 B1 | 4/2001 | Lysenko et al. |
| 6,246,125 B1 | 6/2001 | Axtell |
| 6,249,058 B1 | 6/2001 | Rea |
| 6,278,197 B1 | 8/2001 | Appa |
| 6,285,090 B1 | 9/2001 | Brutsaert et al. |
| 6,327,994 B1 | 12/2001 | Labrador |
| 6,359,401 B1 | 3/2002 | Garcia-Sinclair et al. |
| 6,373,161 B1 | 4/2002 | Khalaf |
| 6,392,371 B1 | 5/2002 | Cheng et al. |
| 6,411,002 B1 | 6/2002 | Smith et al. |
| 6,412,237 B1 | 7/2002 | Sahai |
| 6,426,580 B1 | 7/2002 | Ikeda et al. |
| 6,429,552 B2 | 8/2002 | Asao et al. |
| 6,452,287 B1 | 9/2002 | Looker |
| 6,476,513 B1 | 11/2002 | Gueorguiev |
| 6,476,534 B1 | 11/2002 | Vanderbeck et al. |
| 6,476,535 B1 | 11/2002 | Oohashi et al. |
| 6,483,199 B2 | 11/2002 | Umemoto et al. |
| 6,504,260 B1 | 1/2003 | Debleser |
| 6,522,045 B2 | 2/2003 | Ikeda et al. |
| 6,522,046 B2 | 2/2003 | Ikeda et al. |
| 6,541,877 B2 | 4/2003 | Kim et al. |
| 6,598,573 B2 | 7/2003 | Kobayashi |
| 6,641,367 B1 | 11/2003 | Van der Klippe |
| 6,661,146 B2 | 12/2003 | Oohashi et al. |
| 6,664,704 B2 | 12/2003 | Calley |
| 6,665,990 B1 | 12/2003 | Cody |
| 6,693,409 B2 | 2/2004 | Lynch et al. |
| 6,700,278 B1 | 3/2004 | Ehrfeld et al. |
| 6,741,000 B2 | 5/2004 | Newcomb |
| 6,781,276 B1 | 8/2004 | Stiesdal et al. |
| 6,794,777 B1 | 9/2004 | Fradella |
| 6,794,781 B2 | 9/2004 | Razzell et al. |
| 6,798,082 B1 | 9/2004 | Chen |
| 6,800,956 B2 | 10/2004 | Bartlett |
| 6,814,493 B2 | 11/2004 | Wobben |
| 6,826,874 B2 | 12/2004 | Takeuchi et al. |
| 6,833,633 B2 | 12/2004 | Wobben |
| 6,836,028 B2 | 12/2004 | Northrup et al. |
| 6,836,036 B2 | 12/2004 | Dube |
| 6,841,892 B1 | 1/2005 | Le Nabour et al. |
| 6,844,656 B1 | 1/2005 | Larsen et al. |
| 6,849,965 B2 | 2/2005 | Le Nabour et al. |
| 6,853,094 B2 | 2/2005 | Feddersen et al. |
| 6,856,039 B2 | 2/2005 | Mikhail et al. |
| 6,876,176 B2 | 4/2005 | Stefanovi et al. |
| 6,891,302 B1 | 5/2005 | Gabrys |
| 6,897,577 B2 | 5/2005 | Weeber et al. |
| 6,903,466 B1 | 6/2005 | Mercier et al. |
| 6,909,211 B2 | 6/2005 | Ciciliani et al. |
| 6,911,741 B2 | 6/2005 | Pettersen et al. |
| 6,921,243 B2 | 7/2005 | Canini et al. |
| 6,929,671 B2 | 8/2005 | Kim et al. |
| 6,943,461 B2 | 9/2005 | Kaploun |
| 6,943,462 B2 | 9/2005 | Wobben |
| 6,943,478 B2 | 9/2005 | Zepp et al. |
| 6,946,750 B2 | 9/2005 | Wobben |
| 6,954,004 B2 | 10/2005 | Skeist et al. |
| 6,984,897 B2 | 1/2006 | Skeist |
| 7,004,724 B2 | 2/2006 | Pierce et al. |
| 7,011,598 B2 | 3/2006 | Flamang et al. |
| 7,019,413 B2 | 3/2006 | Kinoshita |

(56) References Cited

U.S. PATENT DOCUMENTS

| | | |
|---|---|---|
| 7,023,160 B2 | 4/2006 | Virtanen et al. |
| 7,042,109 B2 | 5/2006 | Gabrys |
| 7,042,110 B2 | 5/2006 | Mikhail et al. |
| 7,042,128 B2 | 5/2006 | Zepp et al. |
| 7,045,925 B2 | 5/2006 | Frager et al. |
| 7,049,719 B2 | 5/2006 | Wobben |
| 7,061,133 B1 | 6/2006 | Leijon et al. |
| 7,075,192 B2 | 7/2006 | Bywaters et al. |
| 7,081,696 B2 | 7/2006 | Ritchey |
| 7,084,520 B2 | 8/2006 | Zambrano et al. |
| 7,088,029 B2 | 8/2006 | Hiramatsu |
| 7,098,551 B2 | 8/2006 | Wobben |
| 7,105,941 B2 | 9/2006 | Hua |
| 7,105,975 B2 | 9/2006 | Semones et al. |
| 7,109,599 B2 | 9/2006 | Watkins |
| 7,109,625 B1 | 9/2006 | Jore et al. |
| 7,126,235 B2 | 10/2006 | Bernhoff et al. |
| 7,135,952 B2 | 11/2006 | Harding |
| 7,145,266 B2 | 12/2006 | Lynch et al. |
| 7,154,191 B2 | 12/2006 | Jansen et al. |
| 7,154,192 B2 | 12/2006 | Jansen et al. |
| 7,154,193 B2 | 12/2006 | Jansen et al. |
| 7,166,984 B1 | 1/2007 | Jones et al. |
| 7,170,212 B2 | 1/2007 | Balson et al. |
| 7,180,204 B2 | 2/2007 | Grant et al. |
| 7,186,083 B2 | 3/2007 | Bayly |
| 7,190,085 B2 | 3/2007 | Moehlenkamp |
| 7,190,101 B2 | 3/2007 | Hirzel |
| 7,205,678 B2 | 4/2007 | Casazza et al. |
| 7,215,038 B2 | 5/2007 | Bacon |
| 7,230,361 B2 | 6/2007 | Hirzel |
| 7,231,743 B2 | 6/2007 | Takeuchi et al. |
| 7,245,037 B2 | 7/2007 | Ängquist et al. |
| 7,253,543 B2 | 8/2007 | Akiyama |
| 7,289,329 B2 | 10/2007 | Chen et al. |
| 7,291,956 B2 * | 11/2007 | Itoh .................. H02K 3/26 310/208 |
| 7,312,537 B1 | 12/2007 | Walling |
| 7,329,099 B2 | 2/2008 | Hartman |
| 7,332,837 B2 | 2/2008 | Ward et al. |
| 7,345,377 B2 | 3/2008 | Bacon |
| 7,348,705 B2 | 3/2008 | Cai et al. |
| 7,355,309 B2 | 4/2008 | Costin et al. |
| 7,358,624 B2 | 4/2008 | Bacon |
| 7,365,472 B2 | 4/2008 | Hiramatsu |
| 7,372,174 B2 | 5/2008 | Jones et al. |
| 7,375,449 B2 | 5/2008 | Butterfield |
| 7,385,330 B2 | 6/2008 | Trzynadlowski et al. |
| 7,414,331 B2 | 8/2008 | Datta |
| 7,425,771 B2 | 9/2008 | Rivas et al. |
| 7,437,264 B2 | 10/2008 | Pierce et al. |
| 7,439,714 B2 | 10/2008 | Gonzalez et al. |
| 7,446,435 B2 | 11/2008 | Zhang et al. |
| 7,468,569 B2 | 12/2008 | Hirzel |
| 7,478,777 B2 | 1/2009 | Wobben |
| 7,482,720 B2 | 1/2009 | Gordon et al. |
| 7,525,228 B2 | 4/2009 | Chuang et al. |
| 7,538,446 B2 | 5/2009 | Bonnet |
| 7,545,052 B2 | 6/2009 | Gonzalez et al. |
| 7,573,173 B1 | 8/2009 | Frownfelter |
| 7,592,766 B2 | 9/2009 | Patel et al. |
| 7,595,574 B2 | 9/2009 | Ritchey |
| 7,612,463 B2 | 11/2009 | Cullen et al. |
| 7,633,770 B2 | 12/2009 | Datta et al. |
| 7,640,648 B1 | 1/2010 | Rittenhouse |
| 7,646,126 B2 | 1/2010 | Trzynadlowski et al. |
| 7,646,132 B2 | 1/2010 | Halstead |
| 7,646,178 B1 | 1/2010 | Fradella |
| 7,692,357 B2 | 4/2010 | Qu et al. |
| 7,710,081 B2 | 5/2010 | Saban et al. |
| 7,714,479 B2 | 5/2010 | Seneff et al. |
| 7,723,891 B2 | 5/2010 | Rittenhouse |
| 7,750,522 B2 | 7/2010 | Gizaw et al. |
| 7,781,932 B2 | 8/2010 | Jansen |
| 7,808,149 B2 | 10/2010 | Pabst et al. |
| 7,816,833 B2 | 10/2010 | Nair |
| 7,821,164 B2 | 10/2010 | Laskaris et al. |
| 7,830,057 B2 | 11/2010 | Gieras |
| 7,851,965 B2 | 12/2010 | Calley et al. |
| 7,852,643 B2 | 12/2010 | Zhang et al. |
| 7,888,839 B2 | 2/2011 | Gabrys et al. |
| 7,919,879 B2 | 4/2011 | Flannery et al. |
| 7,923,853 B2 | 4/2011 | Lewis |
| 7,923,886 B2 | 4/2011 | Calley et al. |
| 7,928,592 B2 | 4/2011 | Wagoner et al. |
| 7,939,959 B2 | 5/2011 | Wagoner et al. |
| 7,944,068 B2 | 5/2011 | Wagoner et al. |
| 8,097,970 B2 | 1/2012 | Hyvarinen |
| 8,115,348 B2 | 2/2012 | Hsu et al. |
| 8,138,620 B2 | 3/2012 | Wagoner et al. |
| 8,178,992 B1 | 5/2012 | Meller |
| 8,217,533 B2 | 7/2012 | Jones et al. |
| 8,222,792 B2 | 7/2012 | Platon et al. |
| 8,373,307 B2 | 2/2013 | Sihler et al. |
| 8,426,995 B2 | 4/2013 | Langel |
| 2003/0020353 A1 | 1/2003 | Lopatinsky et al. |
| 2004/0021437 A1 | 2/2004 | Maslov et al. |
| 2004/0027020 A1 | 2/2004 | Newcomb |
| 2004/0245866 A1 | 12/2004 | Lopatinsky et al. |
| 2005/0067910 A1 | 3/2005 | Okura |
| 2005/0120856 A1 | 6/2005 | Duford et al. |
| 2005/0285470 A1 | 12/2005 | Itoh |
| 2006/0003604 A1 | 1/2006 | Angerpointner |
| 2006/0012263 A1 | 1/2006 | Smith et al. |
| 2006/0028092 A1 | 2/2006 | Wang et al. |
| 2006/0055265 A1 | 3/2006 | Zalusky |
| 2006/0202584 A1 * | 9/2006 | Jore .................. H02K 21/24 310/179 |
| 2007/0152536 A1 | 7/2007 | Chuang et al. |
| 2008/0088200 A1 | 4/2008 | Ritchey |
| 2008/0100166 A1 | 5/2008 | Stahlhut et al. |
| 2008/0100174 A1 | 5/2008 | Stahlhut et al. |
| 2009/0295231 A1 | 12/2009 | Gaffney et al. |
| 2011/0006600 A1 | 1/2011 | Fontana et al. |
| 2011/0133461 A1 | 6/2011 | Hjort |
| 2011/0241630 A1 | 10/2011 | Ritchey et al. |
| 2011/0273048 A1 | 11/2011 | Jore et al. |
| 2012/0104894 A1 | 5/2012 | Van Den Bossche et al. |
| 2012/0155131 A1 | 6/2012 | Moreno-Castaneda et al. |
| 2012/0175962 A1 | 7/2012 | Zhan et al. |
| 2012/0200177 A1 | 8/2012 | Atkinson et al. |
| 2012/0217746 A1 | 8/2012 | Groendahl et al. |
| 2012/0217831 A1 | 8/2012 | Jore et al. |
| 2012/0221159 A1 | 8/2012 | Olesen |
| 2012/0243274 A1 | 9/2012 | Feng et al. |
| 2013/0015703 A1 | 1/2013 | Rouse et al. |

FOREIGN PATENT DOCUMENTS

| | | |
|---|---|---|
| JP | 59-067860 | 4/1984 |
| JP | S63143077 | 9/1988 |
| JP | 10-285894 A | 10/1998 |
| WO | WO 2010/083054 | 7/2010 |

OTHER PUBLICATIONS

Second Chinese Office Action dated Jul. 6, 2016 for Chinese Application No. 201410069149.5.

Office Action for Chinese Application No. 201080004779.4, mailed Feb. 6, 2013.

International Search Report and Written Opinion for International Application No. PCT/US2010/000112, mailed Mar. 16, 2010.

Extended European Search Report Action dated Jan. 9, 2017 for European Application No. 16189324.3.

* cited by examiner

SEGMENTED STATOR FOR AN AXIAL FIELD DEVICE

CROSS-REFERENCE TO RELATED CASES

This application is a continuation of U.S. patent application Ser. No. 13/144,642, having a 371(c) date of Jul. 14, 2011, and entitled "Segmented Stator for an Axial Field Device," now U.S. Pat. No. 8,823,241, which is a National Stage Entry under 35 U.S.C. §371 of PCT/US2010/000112, filed Jan. 15, 2010, and entitled "Segmented Stator for an Axial Field Device," which claims priority to and the benefit of U.S. Provisional Patent Application No. 61/205,435, filed Jan. 16, 2009, and entitled "Segmented Stator for an Axial Field Machine."

FIELD OF THE INVENTION

The present invention relates to an improved stator for an axial field rotary energy device operating as a motor or a generator as described in U.S. Pat. No. 7,109,625 to Jore et al.

BACKGROUND OF THE INVENTION

The size of machines that may be produced with a one-piece printed circuit board (PCB) stator is limited by the capability of the processing equipment found in a PCB manufacturing facility. High volume facilities have a maximum size PCB panel that can be processed on automated equipment. Certain lower volume facilities routinely process larger PCB panel sizes than the high volume manufacturers but there is a higher cost due to more labor and higher material costs. In order to cost effectively produce large axial field rotary machines that incorporate a PCB stator, a segmented PCB stator is shown and described. The segments allow a much larger diameter machine than is possible with single piece PCB stator designs. Further, the segments may be produced in high volume manufacturing facilities that provide the best cost.

SUMMARY OF INVENTION

The present invention provides an axial rotary energy device which is arranged in a multi-phase electric current configuration. The device includes a rotor having a plurality of permanent magnet poles secured thereto and further includes a segmented stator assembly having a plurality of segments arranged in an annular array. Each stator segment is constructed by stacking a plurality of printed circuit board power conductor layers together with a plurality of much larger diameter machine than is possible with single piece PCB stator designs. Further, the segments may be produced in high volume manufacturing facilities that provide the best cost.

SUMMARY OF INVENTION

The present invention provides an axial rotary energy device which is arranged in a multi-phase electric current configuration. The device includes a rotor having a plurality of permanent magnet poles secured thereto and further includes a segmented stator assembly having a plurality of segments arranged in an annular array. Each stator segment is constructed by stacking a plurality of printed circuit board power conductor layers together with a plurality of printed circuit board series layers. Each stator segment having at least one working power conductor layer for each phase of the electric current and at least one series conductor layer associated with one power conductor layer. Each power conductor layer and series conductor layer having radial conductors extending from an inner diameter via to an outer diameter via. The vias are provided for electrically connecting selected ones of the radial conductors of the series conductor layer to selected ones of the radial conductors of the power conductor layer. Each power conductor layer includes a pair of positive and negative terminal vias for one phase of the electric current connected to selected outer vias of the power conductor layer. A daughter printed circuit board is used for electrically connecting two adjacent segments together. Each daughter printed circuit board having a first portion electrically connected to a negative terminal via located in one segment and a second portion electrically connected to a positive terminal via located in an adjacent segment. A current conductor is provided on the daughter printed circuit board for electrically connecting the negative terminal via and the positive terminal via together.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
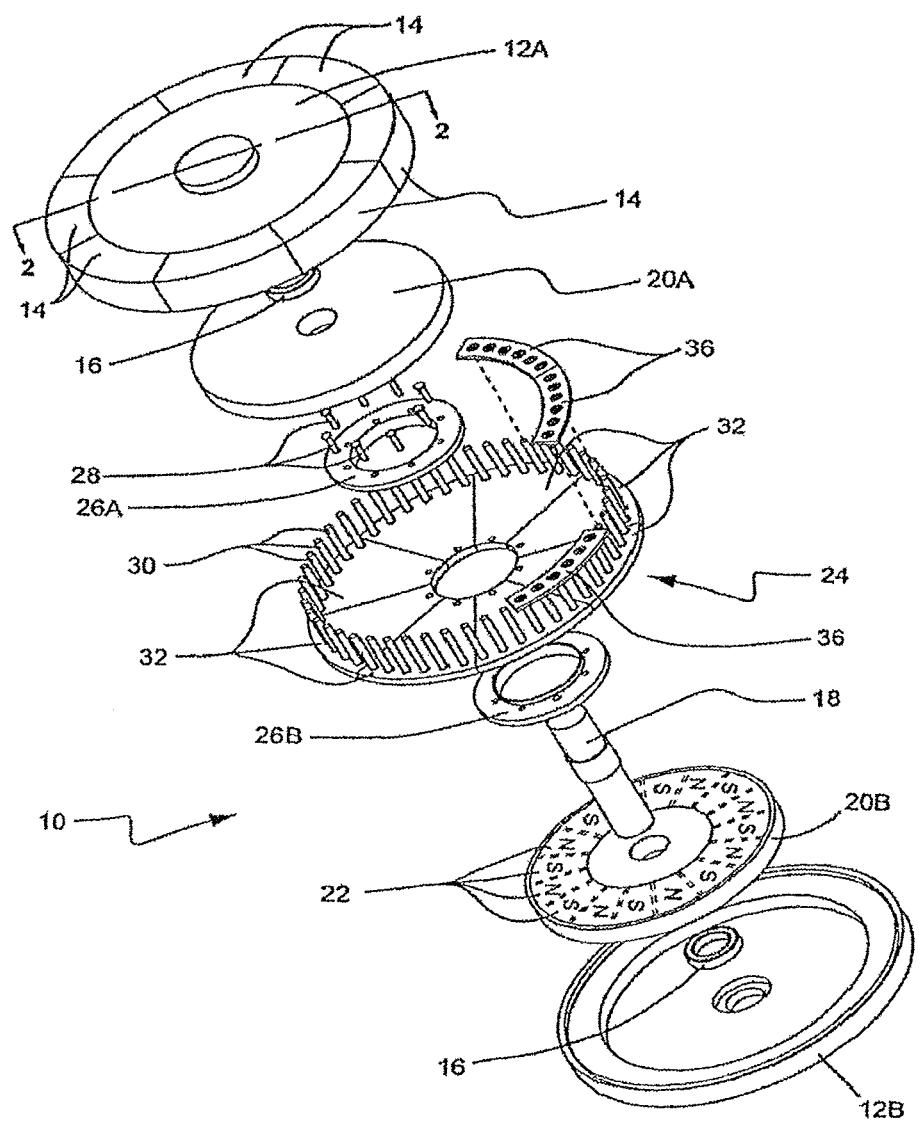
FIG. 1 is an exploded assembly view with parts broken away of an axial field device utilizing the present invention.

An axial gap device 10 according to the present invention is shown in FIG. 1 with a housing 12A having a number of terminal covers 14, a pair of bearings 16, a drive shaft 18, a pair of rotors 20A and 20B each having an annular array of permanent magnets 22 that alternate polarity around the array, another housing 12B, and a segmented stator assembly 24. The segmented stator assembly 24 is comprised of a pair of clamp rings 26A and 26B, a number of fasteners such as bolts 28, a set of terminal pairs (e.g., a plurality of terminal lugs 30) within a terminal portion, and a plurality of stator segments 32. The conducting segments (e.g., stator segments 32) are comprised of multiple layer printed circuit boards that are shaped to fit together to form an annular array of stator segments 32. The multiple layers of conductive material in each stator segment 32 provide a number of turns for each electrical phase of the axial gap device 10.

Figure 2:
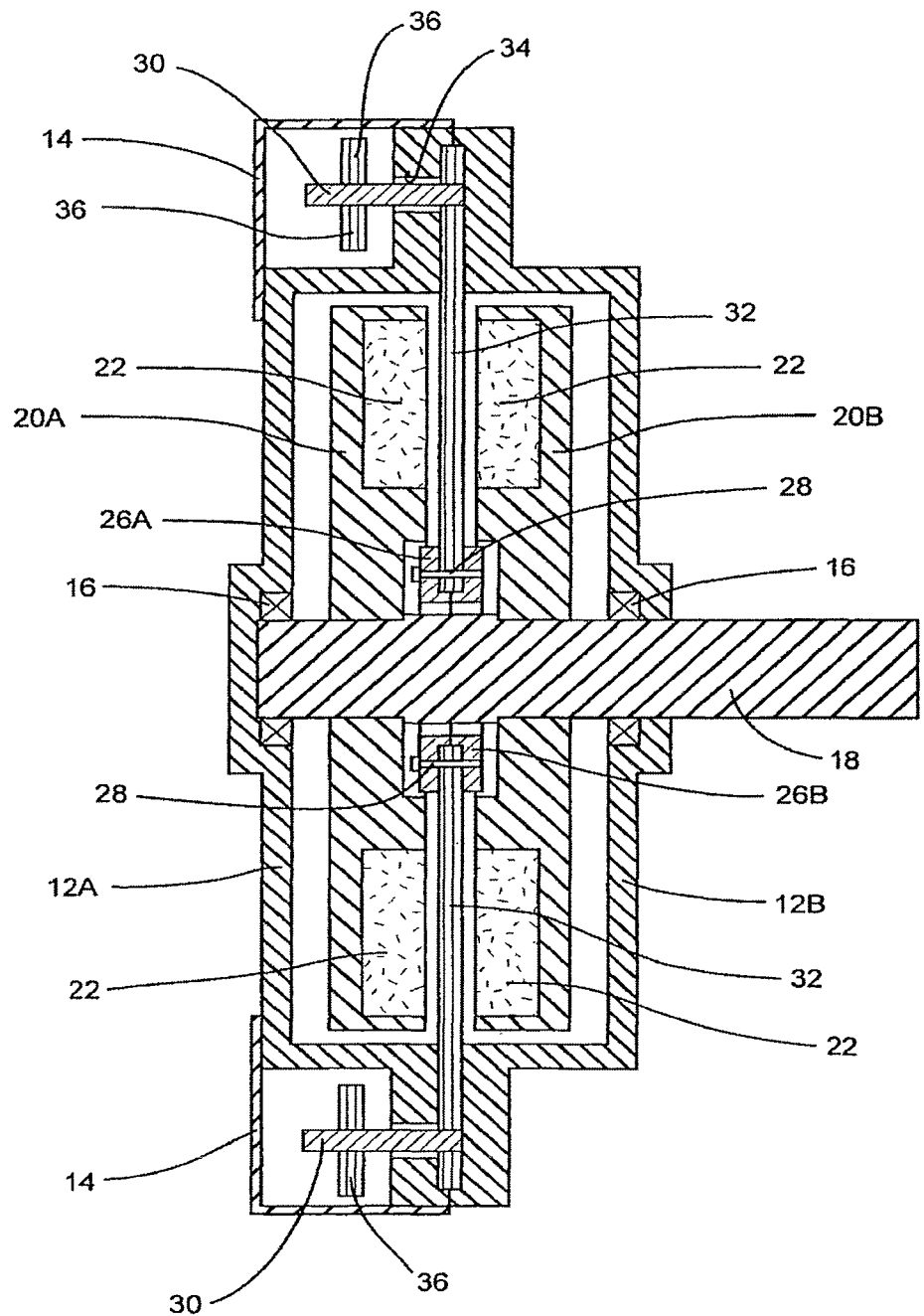
FIG. 2 is a cross-sectional view taken along the line 2-2 in FIG. 1 showing a first embodiment of the present invention.

FIG. 2 illustrates how the clamp rings 26A and 26B and bolts 28 fasten onto either side of the inward edge of the stator segments 32. The outer edge of the stator segments 32 are held in place by the clamping force of the housings 12A and 12B. The clamp rings 26A and 26B and the housings 12A and 12B suspend the stator assembly 24 in the air gap between the permanent magnets 22 mounted on the rotors 20A and 20B. As shown in FIG. 1, each stator segment 32 has a plurality of terminal lugs 30. The terminal lugs 30 are made of an electrically conductive material such as copper. The number of lugs on each segment depends upon the number of electrical phases in the machine. There is a positive and a negative terminal lug 30 for each phase. The illustrated device has three electrical phases and so each stator segment 32 has six terminal lugs 30. FIG. 2 shows how each terminal lug 30 passes through a lug opening 34 in the housing 12A to electrically connect the stator segment 32 to a connecting segment (e.g., daughter printed circuit board 36). An insulating material may be placed around the lug 30 where it passes through the lug opening 34 to prevent the lug 30 from making electrical contact with the housing 12A. The terminal lugs 30 are attached to the stator segments 32 and to the daughter printed circuit boards 36 by soldering or by fastening with some other means, such as a threaded nut over a threaded portion of a terminal lug 30. The multiple layer daughter printed circuit boards 36 electrically connect each phase in one stator segment 32 to each corresponding phase in an adjoining stator segment 32.

Figure 3:
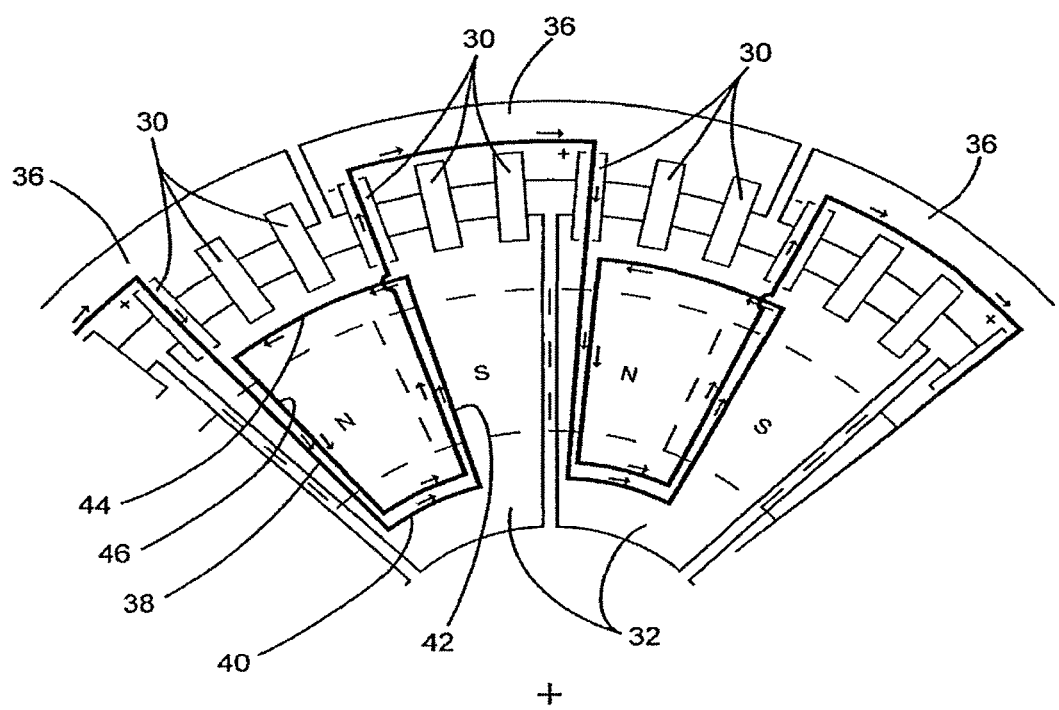
FIG. 3 is a schematic view showing the electrical circuit for one phase of the axial field device through selected stator segments and daughter printed circuit boards.

FIG. 3 diagrammatically shows the electrical circuit for one phase of the axial gap device 10 through selected stator segments 32 and daughter printed circuit boards 36. An electrical current enters a stator segment 32 through a positive terminal lug 30 for the particular phase. The current flows through a first conducting portion (e.g., first working turn 38 (a working turn is the torque producing portion of the circuit within the magnetic gap of the axial field device 10)), then into a second conducting portion (e.g., an inner turn 40), then into a third conducting portion (e.g., a second working turn 42), then into a fourth conducting portion (e.g. an outer end turn 44), and then into a fifth conducting portion (e.g., third working turn 46), and so on until the electrical current has passed through all of the turns for the particular phase in the stator segment 32. The first and third working turns 38 and 46 are associated with one magnetic pole and so the axial field device 10 shown is said to have two turns. The electrical circuit of the diagram in FIG. 3 is shown with two working turns however the number of working turns may be any number depending upon the performance requirement of the axial field device 10 and limited only by the physical space available for working turns in the stator segment 32. Also illustrated in FIG. 3 is the relationship between the number of stator segments 32 in the axial field device 10 to the number of magnet poles of magnets 22. In the preferred embodiment, there will be two magnet poles for every stator segment 32.

Continuing in FIG. 3, electrical current flows from the last working turn into the negative terminal lug 30 and the into the daughter printed circuit board 36 which conducts the electrical current from the negative terminal lug 30 of the first stator segment 32 to the positive terminal lug 30 of a second stator segment 32. The electrical current then flows through all of the turns for the particular phase in the second stator segment 32 and then out through the negative terminal lug 30 of the second stator segment to a second daughter printed circuit board 36. The electrical current is conducted through the entire segment array in the same manner.

Figure 4:
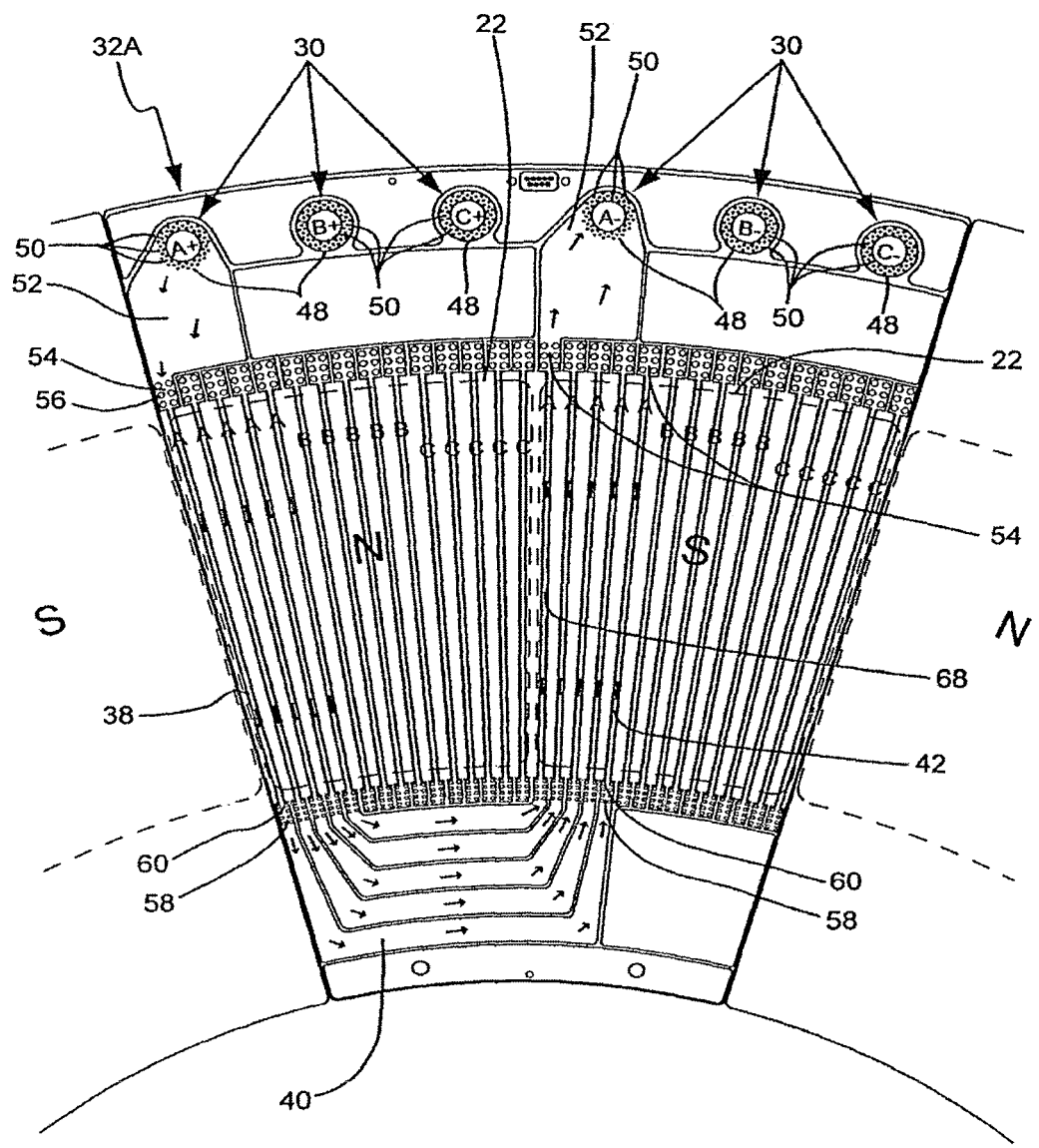
FIG. 4 is a detail view of one segment of a power layer of a stator board for phase A according to the first embodiment of the present invention.

FIG. 4 shows a pattern etched into one layer of conductive material in one of the stator power segments 32A. The pattern has a variety of conductive paths that relate to three electrical phases of the axial field device 10. The pattern has A+, B+, C+, A−, B−, and C− terminal lugs 30. Each of the terminal lugs 30 terminate in a terminal pad 48. Each of the terminal pads 48 have a plurality of terminal via 50 electrically connected to a respective terminal pad 48. A terminal conductor 52 electrically connects a terminal pad 48 to an outer via pad 54 having a plurality of outer vias 56. The pattern shown in FIG. 4 is called a power layer for electrical phase A since it is on this layer that the electrical connection is made to the stator segment 32 for phase A. The terminal conductors 52 of the power layer are continuous with terminal pads A+ and A−. Terminal pads 48 for B+, C+, B−, and C− are in contact with the corresponding terminal lugs 30 but the pads are not connected to terminal conductors 52 on this layer.

In FIG. 4, arrows show the direction of an electrical current to illustrate the relationships of the conductors of the power layer for phase A. The arrows are for reference only since the axial field device operates as a brushless DC or synchronous AC motor or generator. The current is shown to begin at the terminal pad 48 A+ and flow through the terminal conductor 52 to the outer via pad 54. The outer via pad 54 is continuous with a first working conductor 38 on the power layer for phase A. The first working conductor 38 connects the electrical current to the inner via pad 58. As shown in FIG. 4, the first working conductor 38 is substantially within the flux of the permanent magnets 22. Electrical current flowing through the first working conductor 38 will create the Lorenz force that acts between the flowing current and the magnetic flux. The outer via pad 54 has a first set of connectors (e.g., number of outer vias 56 which are plated through holes that electrically connect the outer via pad 54 on the power layer for phase A to the corresponding outer via pads 54 on all of the other conductive layers of the stator segment 32. The inner via pad 58 also has a second set of connectors (e.g., number of inner vias 60) that electrically connect the inner via pad 58 on the phase. A power layer to the corresponding inner via pads 58 on all of the other conductive layers of the stator segment 32.

As seen in FIGS. 4 through 9, the outer via pad 54 is continuous with the first working conductor 38 on each of the conductive layers. Therefore, the outer vias 56 and the inner vias 60 connect all of the working conductors together so that the electrical current flowing through the first working conductor 38 on the power layer for phase A is in parallel with the corresponding working conductors 38 on all of the layers of the stator segment. This is the same for all of the working conductors for all of the phases of the stator segment.

Continuing in FIG. 4, the electrical current flows from the inner via pad 58 to the first inner end turn 40. From the first inner end turn 40, the electrical current flows to an inner via pad 58 which is connected to a second working conductor 42. The second working conductor 42 carries the electrical current to an outer via pad 54. The circuit appears to end at the outer via pad 54 but as previously described, the inner and outer vias 60 and 56 connect all of the second working conductors 42 on all of the layers of conductive material in parallel. The next pattern to be described shows how the circuit for phase A is continued.

Figure 5:
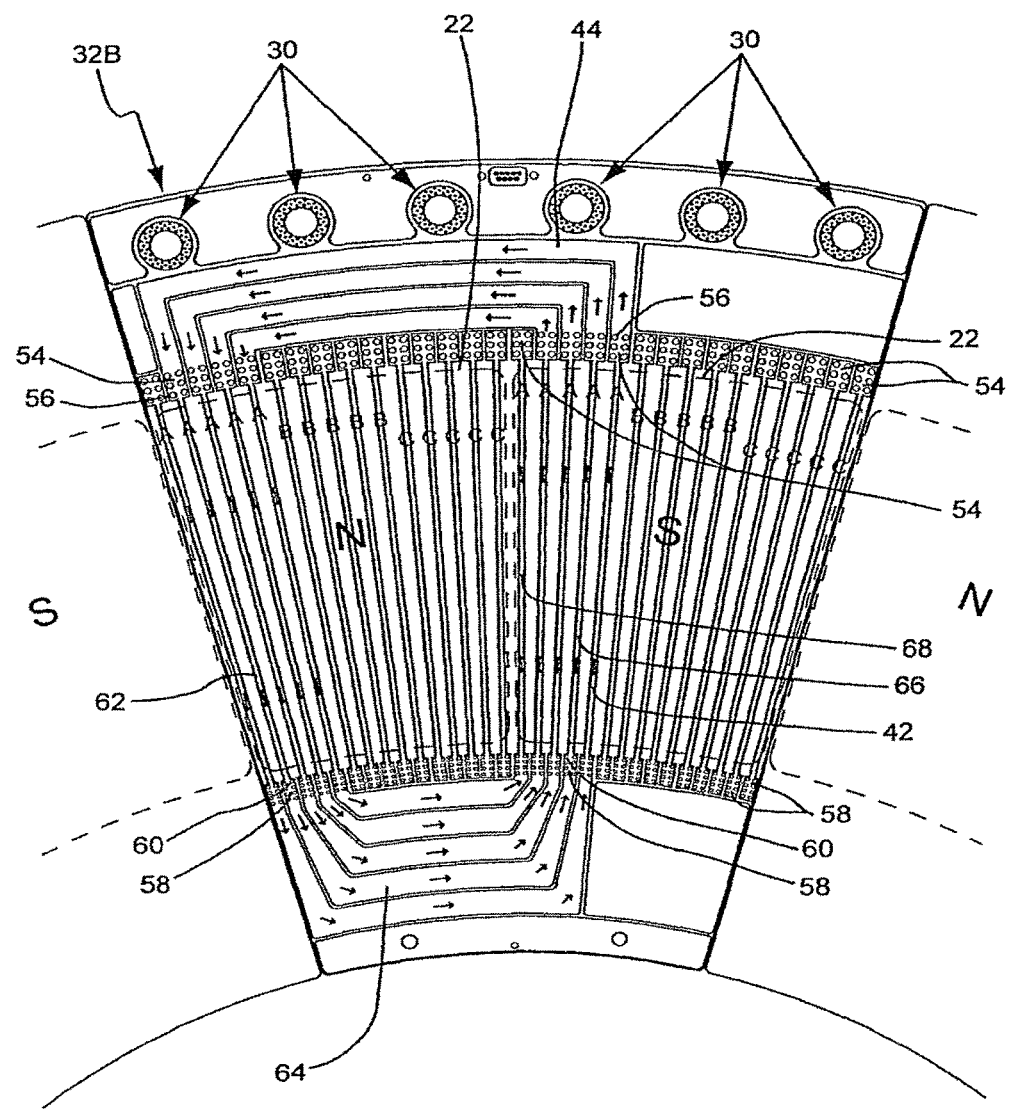
FIG. 5 is a detail view of one segment of a series layer of a stator board for phase A according to the first embodiment of the present invention.

FIG. 5 shows a pattern etched into another conductive layer of the stator series segment 32B. The pattern shown in FIG. 5 is called a series layer for electrical phase A since it contains the outer end turns that electrically connect the working turns for phase A in series. From the outer via pad 54 at the end of the second working conductor 42, the electrical current flows into the first outer end turn 44. The electrical current then flows to an outer via pad 54 with outer vias 56 and then to a third working conductor 62. From the third working conductor 62, the electrical current flows into an inner via pad 58 with inner vias 60. The third working conductors 62 on all layers of conductive material of the stator segment are electrically connected in parallel by the outer vias 56 and the inner vias 60. The electrical current continues from the inner via pad 58 to a second inner end turn 64 and then to an inner via pad 58 and then to a fourth working conductor 66. The electrical current continues on through the working conductors, outer via pads, outer end turns, inner via pads and inner end turns as shown in FIG. 5 until reaching a tenth working conductor 68. From the tenth working conductor 68, the electrical current flows to an outer via pad 54 with outer vias 56. The circuit appears to end at the outer via pad 54 but as previously described, the inner and outer vias 60 and 56 connect all of the tenth working conductors 68 on all of the layers of conductive material in parallel. Referring again to FIG. 4, the electrical current moves from the outer via pad 54 associated with the tenth working conductor to a terminal conductor 52 and then to an A− terminal pad 48.

Figure 6:
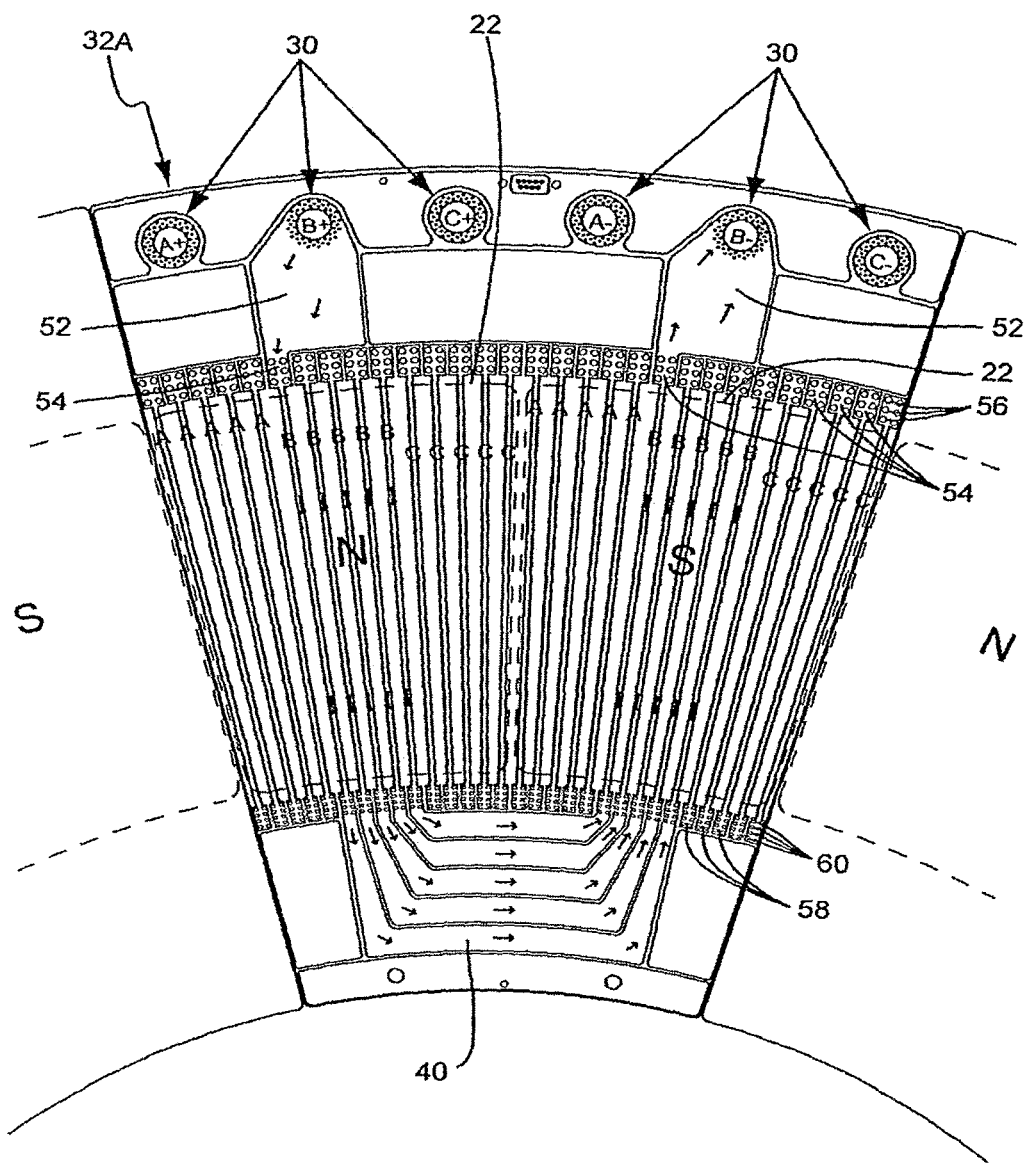
FIG. 6 is a detail view of one segment of a power layer of a stator board for phase B according to the first embodiment of the present invention.
Figure 7:
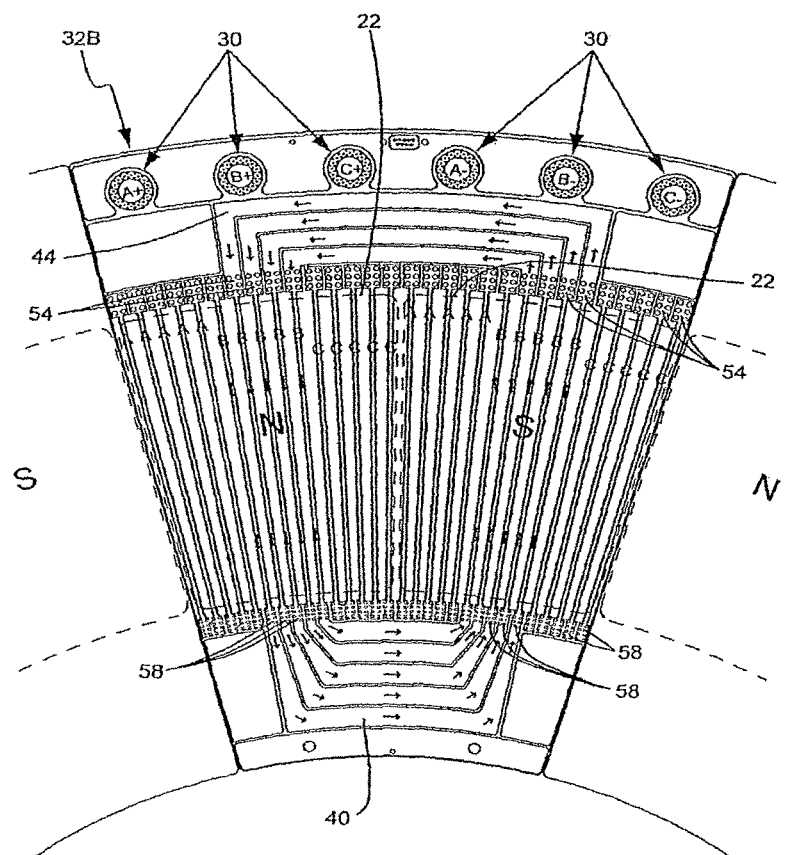
FIG. 7 is a detail view of one segment of a series layer of a stator board for phase B according to the first embodiment of the present invention.
Figure 8:
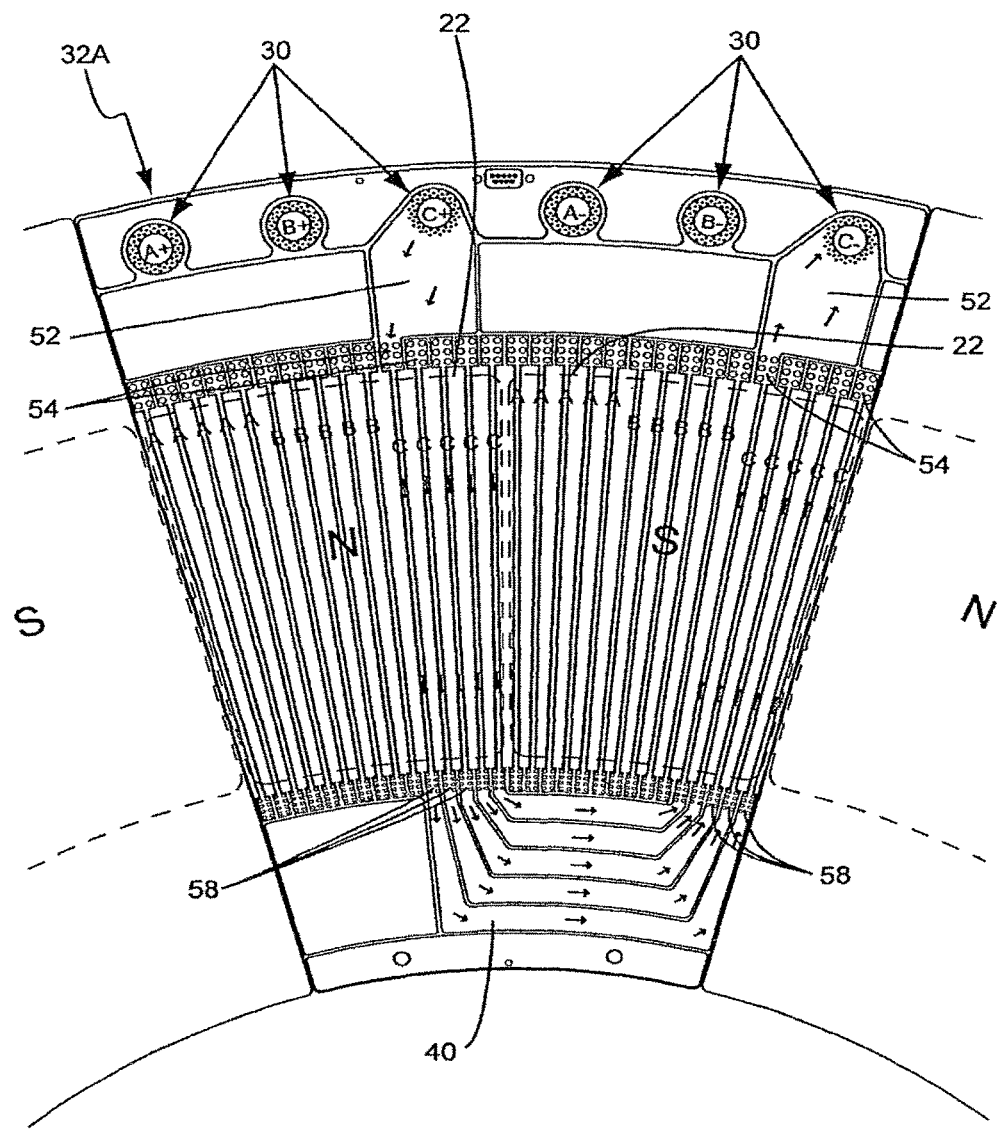
FIG. 8 is a detail view of one segment of a power layer of a stator board for phase C according to the first embodiment of the present invention.
Figure 9:
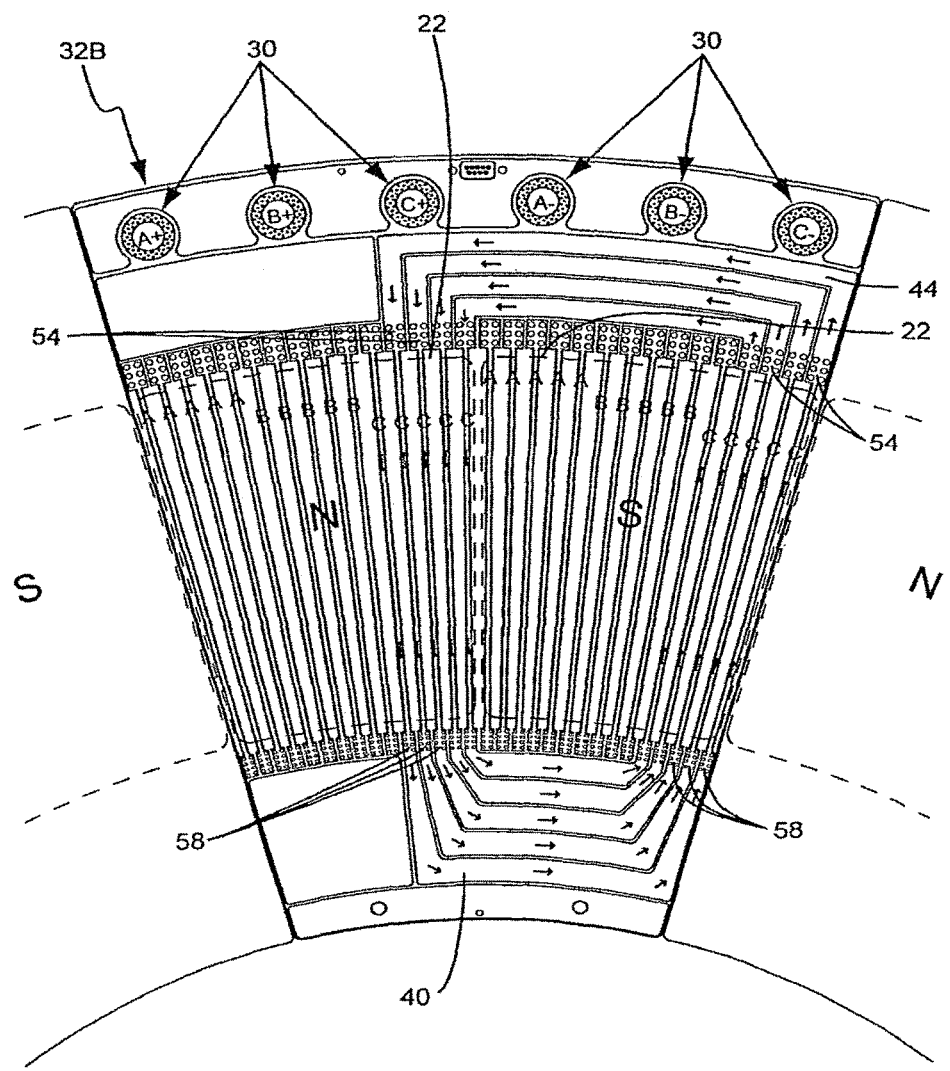
FIG. 9 is a detail view of one segment of a series layer of a stator board for phase C according to the first embodiment of the present invention.

The patterns and electrical current flow is similar for the power and series layers for. phase B and phase C. FIG. 6 shows a pattern etched into another layer of conductive material of the stator power segment 32A that is a power layer for phase B. FIG. 7 shows a pattern on another layer that is a stator series segment 32B for phase B. FIG. 8 shows a pattern on a stator power segment 32A for phase C. And FIG. 9 shows a pattern on a stator series segment 32B.

The multiple layer stator segments 32 of the annular array comprising the entire stator are constructed by stacking the individual stator power segments 32A and stator series segments 32B for the A, B and C phases one on top the other with a substitute dielectric layer 33 provided between each layer. The stacking order of the stator power segments 32A and the stator series segments 32B for phases A, B and C is selectable. There may be duplicates of each layer type in the stator segment. There may be a greater number of series layers than power layers in the stator segment. The order of the layers is preferably selected to provide an even distribution of electrical current throughout different layers of the stator segment and particularly so that there is an even distribution of electrical current through the axial length of the inner and outer vias. The main benefit of the even distribution of the electrical current is to optimize the thermal dissipation of the stator segment 32. The durability of each stator segment 32 is enhanced by reducing the thermal stress that can cause delamination of the layers and cracking in the walls of the vias.

Figure 10:
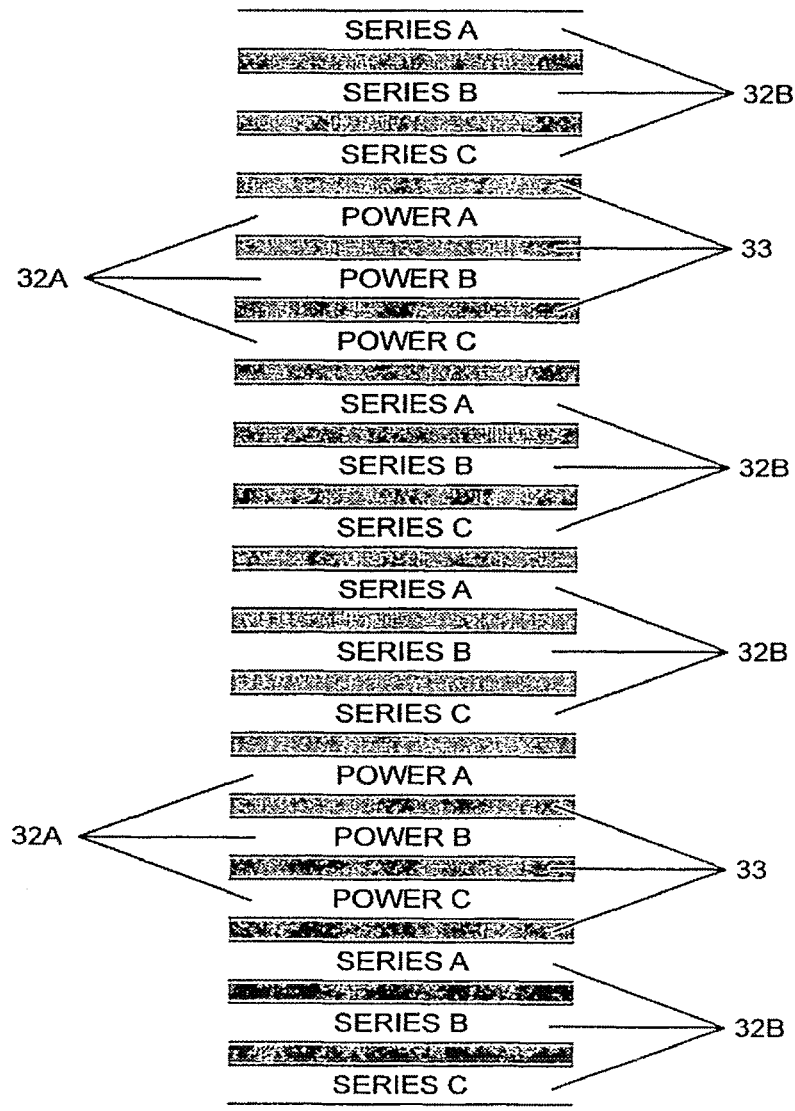
FIG. 10 is a diagram showing one arrangement of the stacking of power layers and series layers for phases A, B and C.
Figure 11:
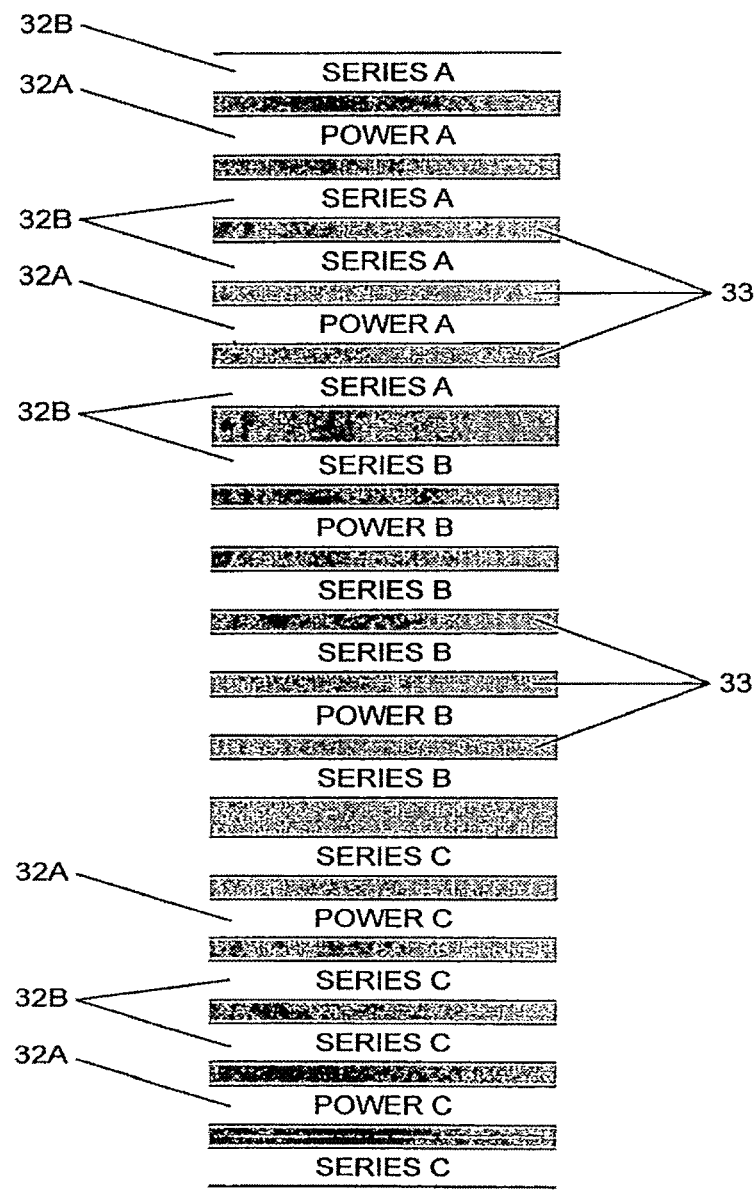
FIG. 11 is a diagram showing another arrangement of the staking of power layers and series layers for phases A, B and C.

As a non-limiting example, a stator segment with eighteen layers might have two power layers for phase A, four series layers for phase A, two power layers for phase B, four series layers for phase B, two power layers for phase C, and four series layers for phase C. FIG. 10 shows one possible stacking arrangement of the layers that provides an even distribution of the electrical current. FIG. 11 shows another possible stacking arrangement of the layers that provides an even distribution of the electrical current and added isolation of the phases for medium and high voltages.

Figure 12:
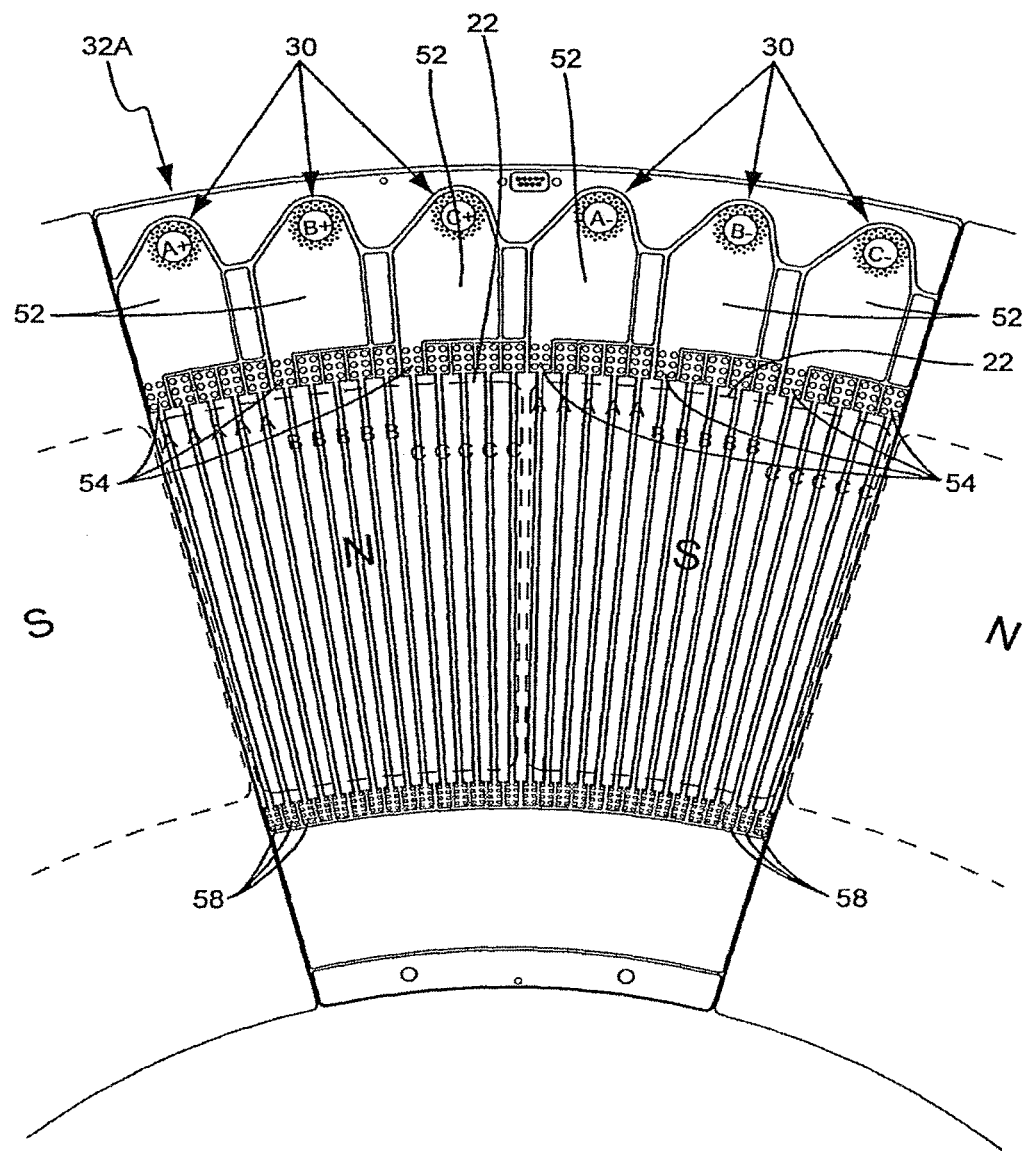
FIG. 12 is a detail view of one segment of a power layer of a stator board according to a second embodiment of the present invention.

FIG. 12 shows another embodiment of the stator segment 32. In this embodiment, a pattern etched into a conductive layer of a stator power segment 32A' includes the terminal conductors 52 for phases A, B, and C. In this embodiment, the power layers for phases A, B, and C as described above would be identical. The main benefit of this embodiment is that there are more terminal conductors 52 in parallel for each phase. However, the inner end turns that were present on the power layers of 32A shown in FIGS. 4, 6, and 8 are absent in this embodiment. With this stator power segment 32A', it is necessary to use the three stator series segments 32B for the phases A, B and C as shown in FIGS. 5, 7 and 9.

Figure 13:
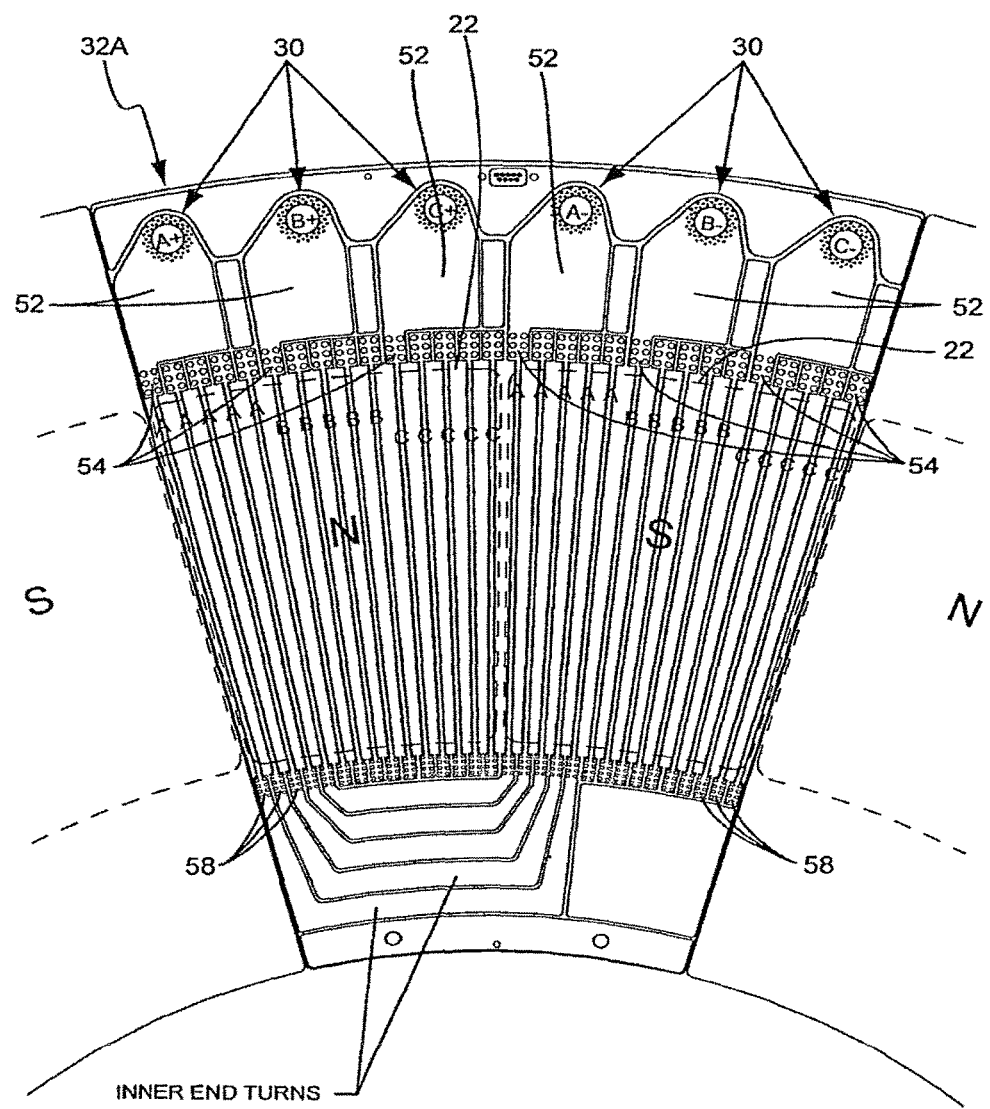
FIG. 13 is a detail view of one segment of a power layer of a stator board according to a third embodiment of the present invention.

FIG. 13 illustrates another embodiment of the stator segment where the inner end turns are present on a stator power segment 32A" that contains terminal conductors 52 for phases A, B, and C. This pattern would then be a power layer for phase A and the power layers in this embodiment therefore are not identical. The power layer for phase B would contain the inner end turns for phase B and the power layer for phase C would contain the inner end turns for phase C. With this stator segment 32A" it is again necessary to use the three stator series segments 32B for the phases A, B and C as shown in FIGS. 5, 7 and 9.

Figure 14:
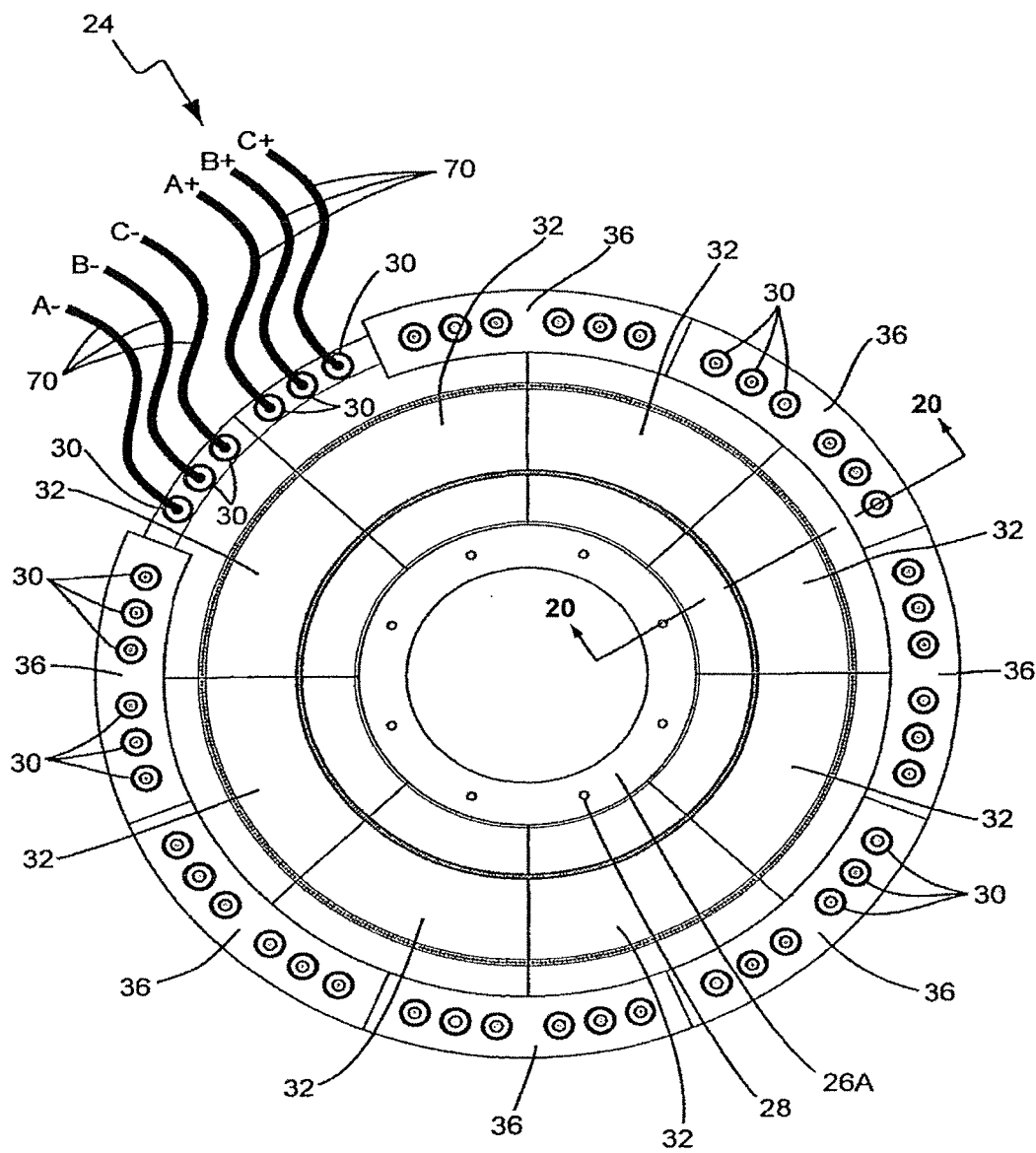
FIG. 14 is a plan view of a stator board showing the arrangement of stator segments and daughter printed circuit boards according to the first embodiment of the present invention.

FIG. 14 illustrates the arrangement of stator segments 32 and daughter printed circuit boards 36 in one embodiment of a stator assembly. The stator assembly has phase conductor wires 70 for phases A, B, and C; an inner clamp ring 26A; bolts 28; and a plurality of daughter printed circuit boards 36 attached to an array of stator segments 32. The stator assembly 24 includes six terminal lugs 30 which are connected to the six phase conductor wires 70 as shown. The phase conductor wires 70 may be arranged as shown or may be configured for a wye or delta connection with the stator assembly 24 as is well known in the art.

Figure 20:
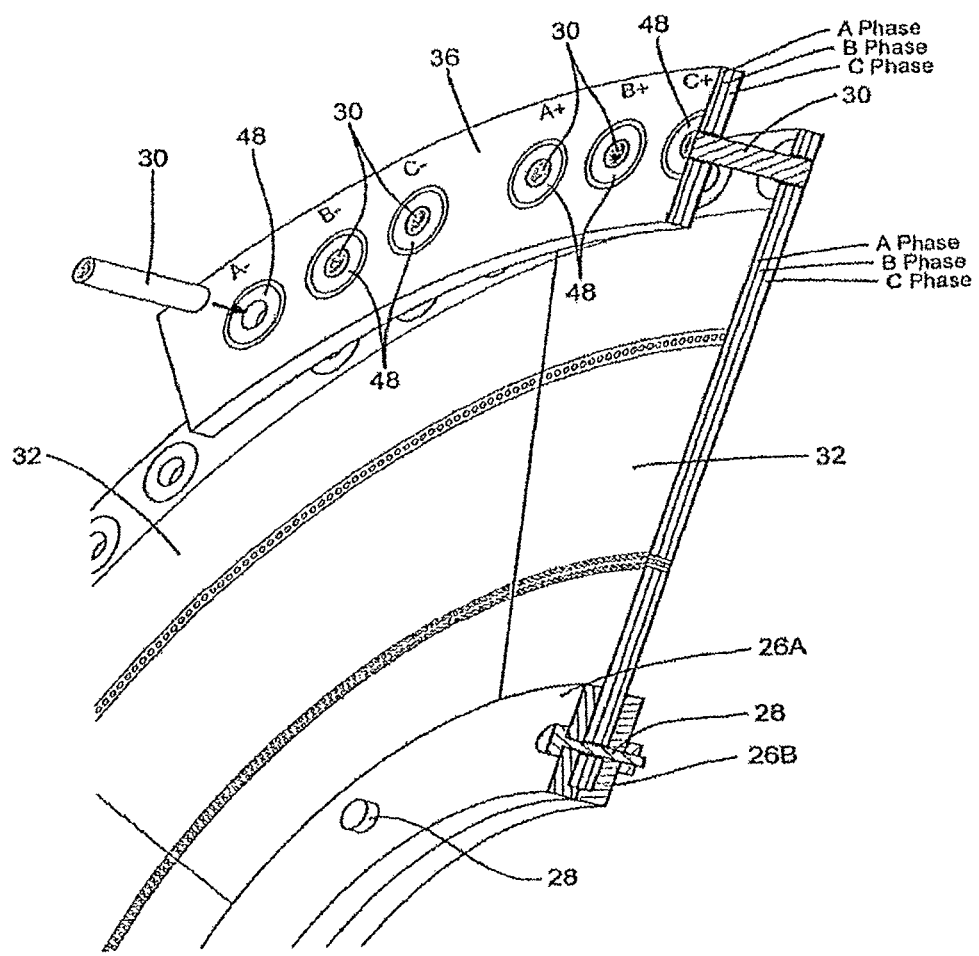
FIG. 20 is a perspective sectional view taken along the line 20-20 in FIG. 14.

The daughter printed circuit boards 36 are used to electrically connect adjacent stator segments 32 together. As shown in FIG. 20, the daughter boards 36 are arranged so that three terminal lugs 30 (A–, B– and C–) of a daughter printed circuit board 36 are positioned over the corresponding terminal lugs 30 of one stator segment 32 and three terminal lugs 30 (A+, B+ and C+) of the same daughter printed circuit board 36 are positioned over the corresponding terminal lugs 30 of the adjacent stator segment 32.

Figure 15:
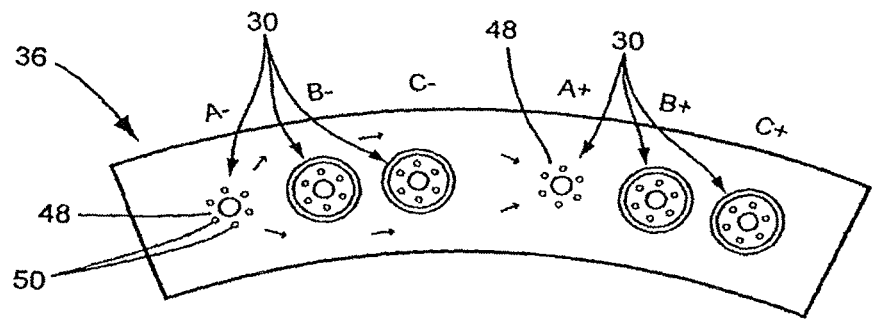
FIG. 15 shows a daughter printed circuit board for the A phase.
Figure 16:
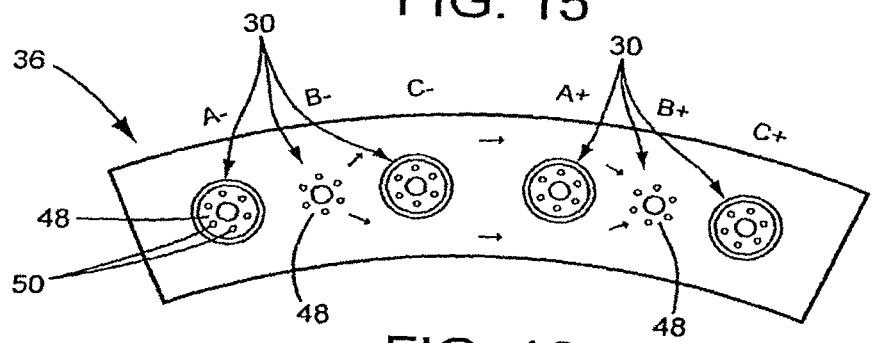
FIG. 16 shows a daughter printed circuit board for the B phase.
Figure 17:
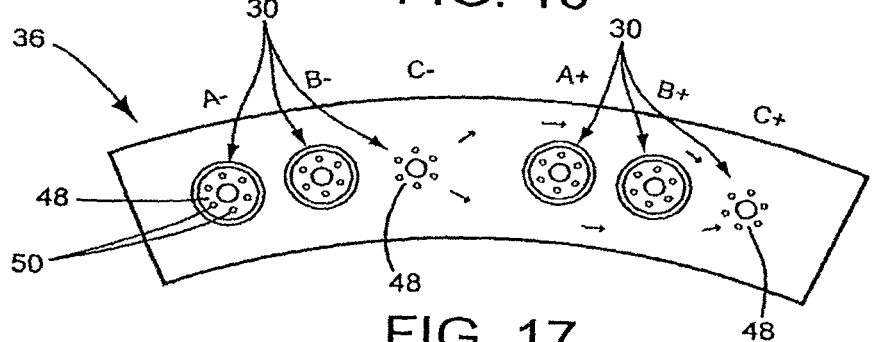
FIG. 17 shows a daughter printed circuit board for the C phase.
Figure 18:
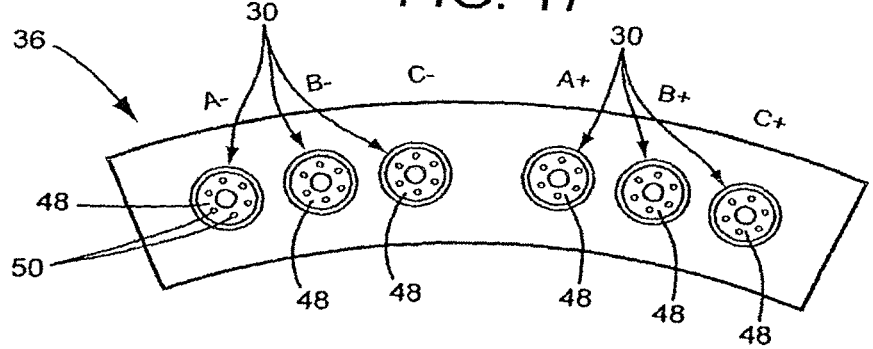
FIG. 18 shows a daughter printed circuit board for the A, B, and C phases electrically isolated.

FIGS. 15 through 17 show the electrical current path on each of the layers of conductive material in the daughter printed circuit boards 36. FIG. 15 shows a pattern etched into a daughter printed circuit board 36 with terminal vias 50 for A– and A+ having an electrical current path between them. The terminal vias 50 for B–, C–, B+, and C+ are isolated from the terminal vias 50 for A– and A+. The terminal lugs 30 have terminal pads 48 with vias 50 that electrically connect the terminal pads 48 to the corresponding terminal pads 48 on all of the other layers of conductive material of the daughter printed circuit boards 36. In FIG. 15, the electrical current for phase A flows from the A– terminal pad 48 through the daughter printed circuit board 36 to the A+ terminal pad 48. In FIG. 16, the electrical current for phase B flows from the B– terminal pad 48 through the daughter printed circuit board 36 to a B+ terminal pad 48. In FIG. 17, the electrical current for phase C flows from C– terminal pad 48 through the daughter printed circuit board 36 to a C+ terminal pad 48. FIG. 18 shows daughter printed circuit board 36 which has all of the terminal pads 48 for the A–, B–, C–, A+, B+, and C+ isolated from one another. In a preferred embodiment, the daughter printed circuit boards 36 shown in FIGS. 15-17 are stacked one upon the other with a dielectric substrate layer in between them. The daughter printed circuit board 36 shown in FIG. 18 is preferably placed on the first and the last layer of the daughter printed circuit board stack in order to electrically isolate the phases on the exterior surfaces the daughter printed circuit boards 36.

Figure 19:
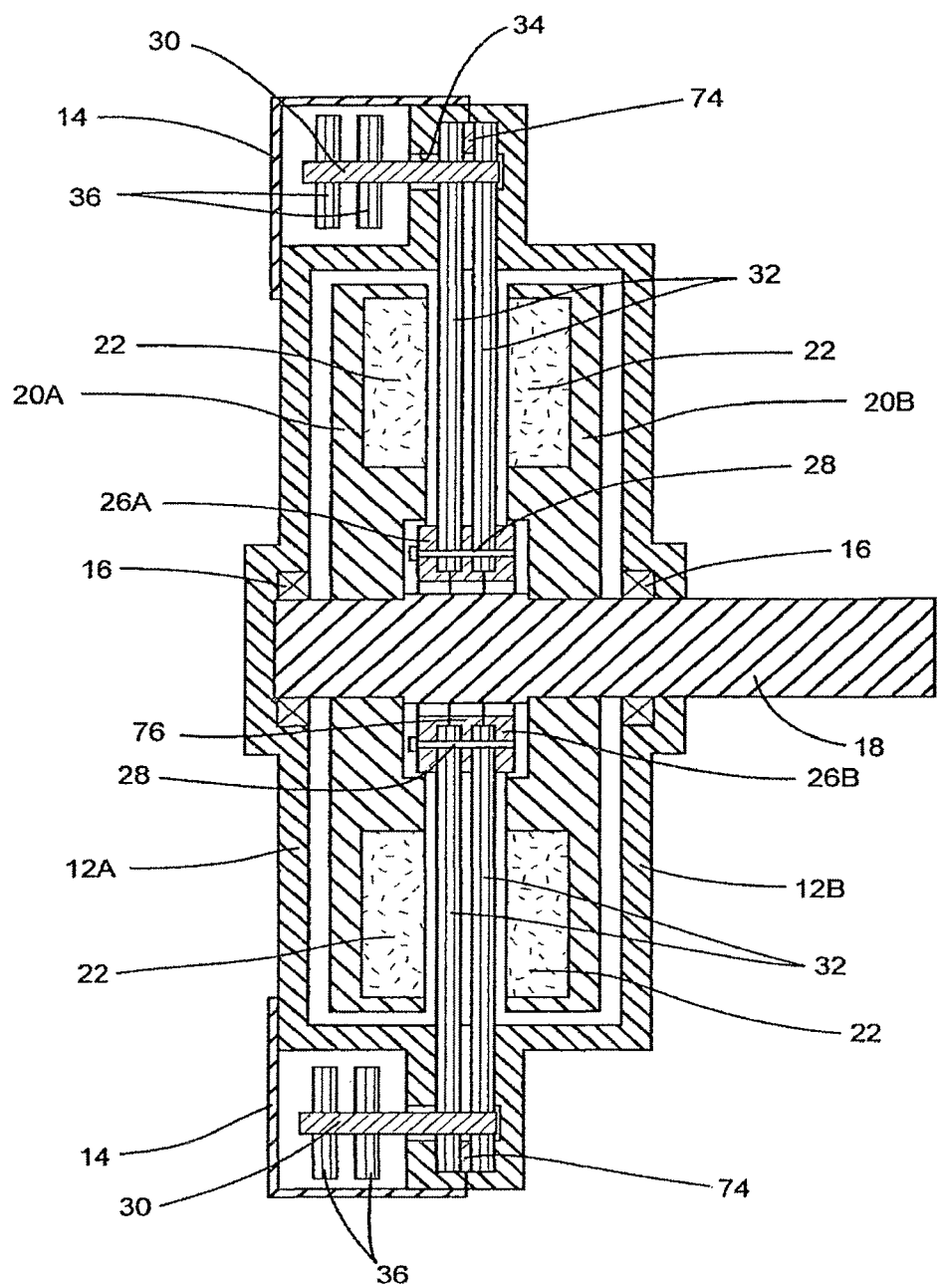
FIG. 19 is a cross sectional view taken along the line 2-2 in FIG. 1 showing a fourth embodiment of the present invention.

FIG. 19 shows another embodiment of the invention which has a stator assembly 24 with two arrays of stator segments 32. The stator segments are electrically connected in parallel by the terminal lugs 30. An outer spacer 74 and an inner spacer 76 keep the stator segments apart to allow for electrical isolation and thermal dissipation. Also shown in FIG. 19 is an arrangement of two stacks of daughter printed circuit boards 36 mounted in parallel across each set of terminal lugs 30. As should be understood by this example, there can by more than two arrays of stator segments 32 within the stator assembly 24. Also it should be understood that there may by more than two stacks of daughter printed circuit boards 36 mounted in parallel across each set of terminal lugs 30. The benefit of having arrays of stator segments 32 and stacks of daughter printed circuit boards 36 mounted in parallel is to reduce the electrical resistance of the circuit.

While the fundamental novel features of the invention have been shown and described, it should be understood that various substitutions, modifications, and variations may be made by those skilled in the arts, without departing from the spirit or scope of the invention. Accordingly, all such modifications or variations are included in the scope of the invention as defined by the following claims:

What is claimed is:

1. An apparatus, comprising:
   a first conducting segment including a first set of conductors and a first set of terminal pairs, each conductor from the first set of conductors being associated with a different electrical phase, each conductor from the first set of conductors being electrically connected to a different terminal pair from the first set of terminal pairs, each terminal pair from the first set of terminal pairs including a positive terminal and a negative terminal;
   a second conducting segment physically distinct from the first conducting segment and configured to be physically and electrically coupled to the first conducting segment to form at least a portion of an annular array, the second conducting segment including a second set of conductors and a second set of terminal pairs, each conductor from the second set of conductors being associated with a different electrical phase, each conductor from the second set of conductors being electrically connected to a different terminal pair from the second set of terminal pairs, each terminal pair from the second set of terminal pairs including a positive terminal and a negative terminal; and
   a connecting segment configured to be physically and electrically coupled to the first conducting segment and to the second conducting segment to form a portion of a segmented winding of an electromagnetic machine, the connecting segment including a third set of terminal pairs, each terminal pair from the third set of terminal pairs being associated with a different electrical phase, each terminal pair from the third set of terminal pairs including a positive terminal and a negative terminal, the positive terminal of each terminal pair from the third set of terminal pairs configured to be electrically coupled to the negative terminal of a different terminal pair from the first set of terminal pairs and the negative terminal of each terminal pair from the third set of terminal pairs configured to be electrically coupled to the positive terminal of a different terminal pair from the second set of terminal pairs when the connecting segment is physically and electrically coupled to the first conducting segment and the second conducting segment.

2. The apparatus of claim 1, wherein the connecting segment is configured to allow electric current associated with an electrical phase to flow between the positive terminal of a terminal pair from the first set of terminal pairs and the negative terminal of a terminal pair from the second set of terminal pairs.

3. The apparatus of claim 1, wherein the connecting segment is configured to be physically and electrically coupled to the first conducting segment and to the second conducting segment to form the portion of the segmented stator included in an axial field electromagnetic machine.

4. The apparatus of claim 1, wherein the first set of conductors and the second set of conductors are configured to be associated with a three-phase electric current.

5. The apparatus of claim 1, wherein the first conducting segment is a printed circuit board including conductive traces on at least one conductive layer.

6. The apparatus of claim 1, wherein the connecting segment is a daughter printed circuit hoard.

7. The apparatus of claim 1, wherein the first conducting segment is a printed circuit board including a plurality of electrically connected conductive layers.

8. The apparatus of claim 1, wherein the positive terminal and the negative terminal of each terminal pair from the third set of terminal pairs are electrically connected, each terminal pair from the third set of terminal pairs being electrically isolated from the remaining terminal pairs from the third set of terminal pairs.

9. An apparatus, comprising:
a first conducting portion included in a first conducting segment, the first conducting portion including a set of conductors, each conductor from the set of conductors being associated with a different electrical phase, the first conducting portion disposed between and electrically coupled to a first set of connectors and a second set of connectors;
a second conducting portion included in the first conducting segment, the second conducting portion including a set of conductors, each conductor from the set of conductors of the second conducting portion being associated with a different electrical phase, the second conducting portion electrically coupled to the first set of connectors and the second set of connectors; and
a terminal portion included in the first conducting segment having a set of terminal pairs, each terminal pair from the set of terminal pairs being associated with a different electrical phase, the terminal portion included in the first conducting segment electrically connected to the second conducting portion such that an electric current associated with a different electrical phase is configured to flow from a first terminal of each terminal pair from the set of terminal pairs to a second terminal of that terminal pair from the set of terminal pairs via the first conducting portion and the second conducting portion, the first conducting portion, the second conducting portion and the terminal portion are arranged to define a first coil interleaved with a second coil on the first conducting segment, the terminal portion included in the first conducting segment configured to be electrically coupled to a terminal portion included in a second conducting segment to form a portion of a segmented stator.

10. The apparatus of claim 9, wherein the first conducting portion is a radial portion and the second conducting portion is at least one of an inner turn portion or an outer turn portion.

11. The apparatus of claim 9, wherein the first conducting segment is a printed circuit board including a plurality of conductive layers, a portion of the first conducting portion being disposed on each layer from the plurality of conductive layers, at least one layer from the plurality of conducting layers not including a portion of the second conducting portion.

12. The apparatus of claim 9, wherein the first conducting segment is a printed circuit board including a plurality of conductive layers, the first set of connectors and the second set of connectors being conductive vias configured to electrically connect at least a portion of the plurality of conductive layers.

13. The apparatus of claim 9, wherein the terminal portion of the first conducting segment is electrically connected to a connecting segment, the terminal portion of the first conducting segment configured to be electrically coupled to the terminal portion of the second conducting segment via the connecting segment to form the portion of the segmented stator.

14. The apparatus of claim 9, wherein each terminal pair from the set of terminal pairs is electrically isolated from the remaining terminal pairs from the set of terminal pairs.

15. The apparatus of claim 9, wherein the first conducting segment is configured to be electrically coupled to the second conducting segment to form the portion of the segmented stator such that the segmented stator is electrically coupled to an electric circuit via a wired connection, a wye connection, or a delta connection.

16. The apparatus of claim 9, wherein the first coil is associated with a first electrical phase and the second coil is associated with a second electrical phase different from the first electrical phase.

17. The apparatus of claim 9, wherein the first conducting portion is configured to be physically and electrically coupled to the second conducting portion to define a portion of an annular array.

18. An apparatus, comprising:
a plurality of conducting segments, each conducting segment from the plurality of conducting segments being physically distinct from the remaining conducting segments from the plurality of conducting segments, the plurality of conducting segments configured to be coupled together to form at least a portion of an annular array, each conducting segment from the plurality of conducting segments including a plurality of conducting portions associated with an electrical phase, each conducting portion from the plurality of conducting portions being electrically connected to a first terminal and a second terminal such that an electric current associated with the electrical phase is configured to flow from the first terminal to the second terminal via the plurality of conducting portions; and
a plurality of connecting segments, each connecting segment from the plurality of connecting segments including a first terminal and a second terminal, the first terminal and the second terminal of each connecting segment from the plurality of connecting segments being associated with the electrical phase, the first terminal and the second terminal of each connecting segment from the plurality of connecting segments configured to be electrically connected to the second terminal of a first conducting segment from the plurality of conducting segments and the first terminal of a second conducting segment from the plurality of conducting segments, respectively, to form a portion of a segmented stator, the electric current associated with the electrical phase configured to flow through each conducting segment from the plurality of conducting segments and each connecting segment from the plurality of connecting segments.

19. The apparatus of claim 18, wherein the plurality of conducting portions of each conducting segment from the plurality of conducting segments is configured to include at least one coil associated with the electrical phase.

20. The apparatus of claim 18, wherein each conducting segment from the plurality of conducting segments is a printed circuit board including a plurality of conducting layers, each conducting portion from the plurality of conducting portions being associated with at least one conducting layer from the plurality of conducting layers.

21. The apparatus of claim 18, wherein the plurality of conducting portions included in each conducting segment from the plurality of conducting segments includes a plurality of conducting portions associated with a first electrical phase, a plurality of conducting portions associated with a second electrical phase, and a plurality of conducting portions associated with a third electrical phase.

22. The apparatus of claim 18, wherein the first terminal and the second terminal of each connecting segment from the plurality of connecting segments is associated with a first electrical phase, each connecting segment from the plurality of connecting segments including a third terminal and a fourth terminal associated with a second electrical phase and a fifth terminal and a sixth terminal associated with a third electrical phase.

\* \* \* \* \*

UNITED STATES PATENT AND TRADEMARK OFFICE
CERTIFICATE OF CORRECTION

PATENT NO. : 9,762,099 B2
APPLICATION NO. : 14/193012
DATED : September 12, 2017
INVENTOR(S) : Matthew B. Jore et al.

It is certified that error appears in the above-identified patent and that said Letters Patent is hereby corrected as shown below:

In the Claims

Column 8, Line 50 (Claim 3, Line 5):
"stator included in an axial field electromagnetic machine." should be --winding included in an axial field electromagnetic machine.--

Column 8, Line 58 (Claim 6, Line 2):
"segment is a daughter printed circuit hoard." should be --segment is a daughter printed circuit board.--

Signed and Sealed this
Twenty-first Day of November, 2017

Joseph Matal
*Performing the Functions and Duties of the
Under Secretary of Commerce for Intellectual Property and
Director of the United States Patent and Trademark Office*